United States Patent
Diaz et al.

(10) Patent No.: US 10,931,453 B2
(45) Date of Patent: Feb. 23, 2021

(54) DISTRIBUTED ENCRYPTION KEYS FOR TOKENS IN A CLOUD ENVIRONMENT

(71) Applicant: International Business Machines Corporation, Armonk, NY (US)

(72) Inventors: Fernando J. Diaz, Austin, TX (US); Shawn P. Mullen, Buda, TX (US); Michael Perng, Austin, TX (US); Karen Mariela Siles, Austin, TX (US); Elvin Dalipe Tubillara, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 15/911,332

(22) Filed: Mar. 5, 2018

(65) Prior Publication Data
US 2019/0273613 A1 Sep. 5, 2019

(51) Int. Cl.
*H04L 9/32* (2006.01)
*H04L 9/14* (2006.01)
(Continued)

(52) U.S. Cl.
CPC ............ *H04L 9/3213* (2013.01); *H04L 9/006* (2013.01); *H04L 9/0819* (2013.01);
(Continued)

(58) Field of Classification Search
CPC .. H04W 12/009; H04L 41/50; H04L 2209/24; H04L 63/06; H04L 63/062; H04L 63/068; G06F 21/62
See application file for complete search history.

(56) References Cited

U.S. PATENT DOCUMENTS

| | | | |
|---|---|---|---|
| 5,345,506 | A | 9/1994 | Tsubakiyama et al. |
| 8,909,939 | B1 | 12/2014 | Beda, III et al. |

(Continued)

FOREIGN PATENT DOCUMENTS

CN 105790950 A 7/2016

OTHER PUBLICATIONS

Bragstad, Lance "Fernet tokens and key rotation" [Online], Mar. 4, 2015 [Retrieved on: Aug. 1, 2020], Retrieved on: <https://www.lbragstad.com/blog/fernet-tokens-and-key-rotation > (Year: 2015).*

(Continued)

*Primary Examiner* — Eric W Shepperd
(74) *Attorney, Agent, or Firm* — Brown & Michaels, PC; Michael O'Keefe

(57) ABSTRACT

Authentication of tokens and associated are used to provide a just-in-time key synchronization for user access to a service in a cloud computing environment which includes a plurality of availability zones with an identity service, a storage system, and a keystore. The encryption keys are distributed by the storage system based on a user access request containing a token with a payload and a current user cryptographic key. The token is then sent to the keystore to authenticate the user. The keystore authenticates the user and sends the token with the current cryptographic key to the storage system. The storage system receives the token with the current cryptographic key and grants access to the user for the service.

20 Claims, 6 Drawing Sheets

(51) Int. Cl.
*H04L 9/30* (2006.01)
*H04L 9/00* (2006.01)
*H04L 9/08* (2006.01)

(52) U.S. Cl.
CPC .............. *H04L 9/0894* (2013.01); *H04L 9/14* (2013.01); *H04L 9/30* (2013.01)

(56) References Cited

U.S. PATENT DOCUMENTS

| | | | |
|---|---|---|---|
| 9,425,958 B2 | 8/2016 | Vennelakanti et al. | |
| 9,530,011 B2 | 12/2016 | French | |
| 10,372,926 B1* | 8/2019 | Leshinsky | H04L 9/0894 |
| 10,498,837 B1* | 12/2019 | Bondalapati | H04L 67/16 |
| 10,581,687 B2* | 3/2020 | Singh | G06F 9/45533 |
| 10,659,443 B2* | 5/2020 | Ahmed | H04L 63/0807 |
| 2002/0080975 A1* | 6/2002 | Rich | H04L 9/3263 380/286 |
| 2018/0260125 A1* | 9/2018 | Botes | G06F 3/067 |
| 2018/0270219 A1* | 9/2018 | Li | H04W 12/06 |
| 2018/0365045 A1* | 12/2018 | Hakala | G06F 21/575 |

OTHER PUBLICATIONS

Porunov, Oleksandr "Automatic scalability of the OpenStack object storage" [Online], May 16-17, 2017 [Retrieved on: Aug. 2, 2020], PhD Symposium at ICTERI 2017, Retrieved from: <http://ceur-ws.org/Vol-1851/paper-9.pdf > (Year: 2017).*

"Openstack" [Online], Feb. 24, 2018 [Retrieved on: Aug. 3, 2020], www.openstack.org, Retrieved from: <https://web.archive.org/web/20180224163020/https://www.openstack.org/ > (Year: 2018).*

Anonymously; "Method to customize token usage handling and revocation"; http://ip.com/IPCOM/000230655D; Aug. 29, 2013.

Anonymously; "Secure authorization token"; http://ip.com/IPCOM/000230939D; Sep. 18, 2013.

Anonymously; "A Token-based System and Method for Managing a Network of Plugin Hybrid Electric Vehicles"; http://ip.com/IPCOM/000199937DI Sep. 21, 2010.

Anonymously; "A system and method for generating tamper-proof tokens using a secret mixing blueprint and random salt for remotely controlling access to resources in a stateless resource server"; http://ip.com/IPCOM/000244660D; Jan. 6, 2016.

* cited by examiner

DISTRIBUTED ENCRYPTION KEYS FOR TOKENS IN A CLOUD ENVIRONMENT

BACKGROUND

The present invention relates to encryption, and more specifically to distributed encryption keys for tokens in a cloud environment.

Current industry solutions for key synchronization of cryptographic keys and key management throughout multiple cloud availability zones (AZs) in cloud environments are based on traditional enterprise environments and do not scale to the speeds and geographic breath of cloud environments.

An example of a cloud environment is OpenStack®, which is open source cloud software. OpenStack® has several components for authentication, KeyStone and Barbican. KeyStone is an identity service used by OpenStack® for authentication and high-level authorization. OpenStack® currently supports token-based authentication and user-service authorization. Barbican is a representational state transfer (REST) application programming interface (API) designed for the secure storage, provisioning and management of secrets such as passwords, encryption keys and X509 Certificates.

KeyStone authenticates user's browsers or programs via REST APIs. For example when a user accesses OpenStack® services, the user is prompted by KeyStone to authenticate with a username and password in a default configuration. After authenticating, a token is returned to the user's browser in the form of a cookie. The token is then passed with all requests to the OpenStack® services, so that the user does not need to re-enter their password on each request. The token has an expiration time of a few hours.

Barbican is the keystore which stores and provides cryptographic keys, such as symmetric keys used in protecting data at REST.

A fernet token is a bearer token that represents user authentication. Fernet tokens contain a limited amount of identity and authorization data in a MessagePacked payload. The payload is then wrapped as a Fernet message for transport, where Fernet provides the required web safe characteristics for use in URLs and headers. The data inside a fernet token is protected using symmetric encryption keys, or fernet keys. The keys are known to all KeyStones across all of the AZs of the cloud environment. Keys can have many states.

NIST guidance on key states and transitions.

PRE-ACTIVATION STATE—Key is created but not authorized to use

ACTIVE STATE—Key may be used to crypto protect data in a deactivation state. A Key whose crypto-period has expired but is still needed to perform. Crypto processing until it is destroyed.

DESTROYED STATE—The key is destroyed and will be wiped. Even through the key no longer exists in this state, certain key attributes must remain (e.g., key name, type, and crypto-period) may be retained.

COMPROMISED STATE: Generally, keys are compromised when they are released (to or determined by an unauthorized entity. If the integrity or secrecy of the key is suspect, the compromised key is revoked.

DESTROYED COMPROMISED STATE: The key is destroyed after a compromise, or (the key is destroyed and a compromise is later discovered. Key attributes (e.g., key name, type, and cryptoperiod) may be retained.

For example, when the user puts a file into their encrypted object store (Swift). The object store is a scalable redundant object storage system. A Swift Proxy needs to access the user's symmetric key from Barbican. Therefore, Swift will call to Barbican and request the user's symmetric key. The user's token is passed in the call from the Swift to Barbican. Barbican in turn verifies the token is valid for that particular user, and returns the users fernet key to the Swift.

Larger cloud environments include Availability Zones (AZs). Each AZ includes a object store (Swift), an identity service (KeyStone) and a keystore (Barbican).

When User A accesses Swift in a first availability zone (AZ-1) for the first time, the user is redirected to KeyStone to enter a username and password, after which KeyStone will return a token. If User A then accesses a service from a second availability zone (AZ-2), the KeyStone of AZ-2 needs to recognize that the User A's token is valid. Currently, OpenStack® uses two types of tokens: public key infrastructure (PKI) and Fernet.

In the example above, when User A accesses AZ-2, the KeyStone of AZ-2 decrypts the fernet token, and by decrypting the fernet token, KeyStone can verify that the fernet token came from a trusted KeyStone and allow authentication.

Currently there is no consistency between availability zones of a cloud environment for the Barbican keystores.

For example, if User A is accessing AZ1 and changes their key(s) in Barbican, User A will not be able to access their data in the other AZs of the cloud environment unless the user's Barbican keystores are in sync. A replication service is used to replicate data across AZs of the cloud environment. However, a replication service does not work in an active cloud environment. The replication service or link can be lost. Also, there are potential issues with encrypting such sensitive data (key information) across AZs. Furthermore, there is the issue of latency. When User A authenticates in a KeyStone associated with an updated Barbican keystore, and then attempts to access data in a different AZ the decryption of User A's data will fail until the keystores are synchronized.

SUMMARY

According to one embodiment of the present invention, a method of distributing encryption keys for tokens for a user to access at least one service in a software environment comprising a plurality of availability zones each availability zone comprising an identity service, a storage system, and a keystore is disclosed. The method comprising the steps of: the storage system receiving an access request from the user containing a token comprising a payload and a current user cryptographic key, to access the at least one service in a first availability zone of the software environment; the storage system sending a token from the access request to the keystore to authenticate the user; the keystore authenticating the user based on the payload of the token; the keystore comparing the current user cryptographic key to user cryptographic keys in the keystore; the keystore updating the user cryptographic key in the token or in the keystore with the most current cryptographic key and deprecating the other cryptographic key; the keystore sending the token with the current cryptographic key to the storage system; and the storage system receiving the token with the current cryptographic key and granting access to the user for the service and sending the token to the user containing the current cryptographic key.

According to another embodiment of the present invention, a computer program product for distributing encryption keys for tokens for a user to access at least one service in a software environment comprising a plurality of availability zones each availability zone comprising an identity service, a storage system, and a keystore. The identity service, the storage system and the keystore each comprising a computer comprising at least one processor, one or more memories, one or more computer readable storage media, the computer program product comprising a computer readable storage medium having program instructions embodied therewith. The program instructions executable by the computer to perform a method comprising: receiving, by the storage system, an access request from the user containing a token comprising a payload and a current user cryptographic key, to access the at least one service in a first availability zone of the software environment; sending, by the storage system, a token from the access request to the keystore to authenticate the user; authenticating, by the keystore, the user based on the payload of the token; comparing, by the keystore, the current user cryptographic key to user cryptographic keys in the keystore; updating, by the keystore, the user cryptographic key in the token or in the keystore with the most current cryptographic key and deprecating the other cryptographic key; sending, by the keystore, the token with the current cryptographic key to the storage system; and receiving, by the storage system, the token with the current cryptographic key and granting access to the user for the service and sending the token to the user containing the current cryptographic key.

According to another embodiment of the present invention, a computer system for distributing encryption keys for tokens for a user to access at least one service in a software environment comprising a plurality of availability zones each availability zone comprising an identity service, a storage system, and a keystore is disclosed. The computer system comprising a computer comprising at least one processor, one or more memories, one or more computer readable storage media having program instructions executable by the computer to perform the program instructions comprising: receiving, by the storage system, an access request from the user containing a token comprising a payload and a current user cryptographic key, to access the at least one service in a first availability zone of the software environment; sending, by the storage system, a token from the access request to the keystore to authenticate the user; authenticating, by the keystore, the user based on the payload of the token; comparing, by the keystore, the current user cryptographic key to user cryptographic keys in the keystore; updating, by the keystore, the user cryptographic key in the token or in the keystore with the most current cryptographic key and deprecating the other cryptographic key; sending, by the keystore, the token with the current cryptographic key to the storage system; and receiving, by the storage system, the token with the current cryptographic key and granting access to the user for the service and sending the token to the user containing the current cryptographic key.

DETAILED DESCRIPTION

Figure 1:
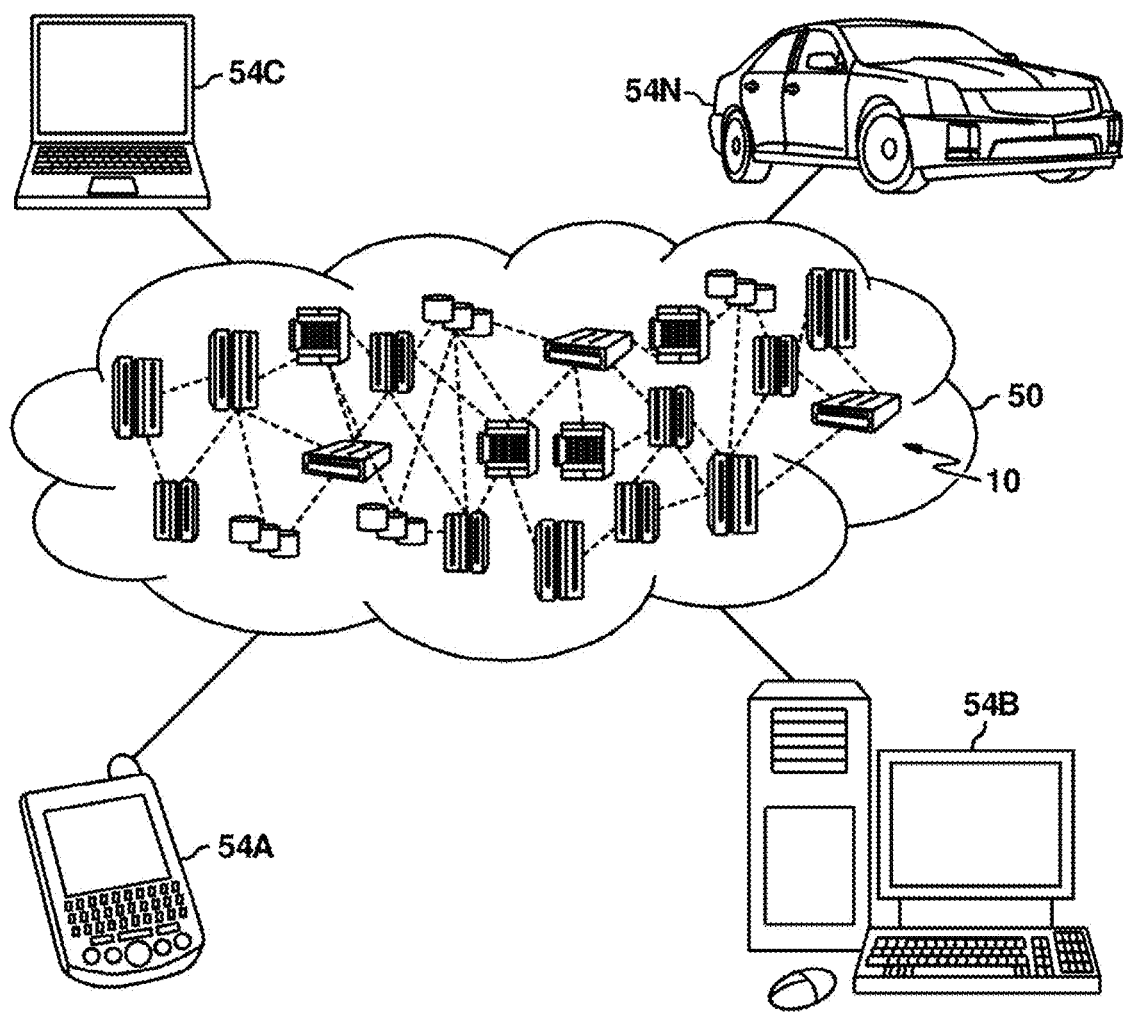
FIG. 1 depicts a cloud computing node according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
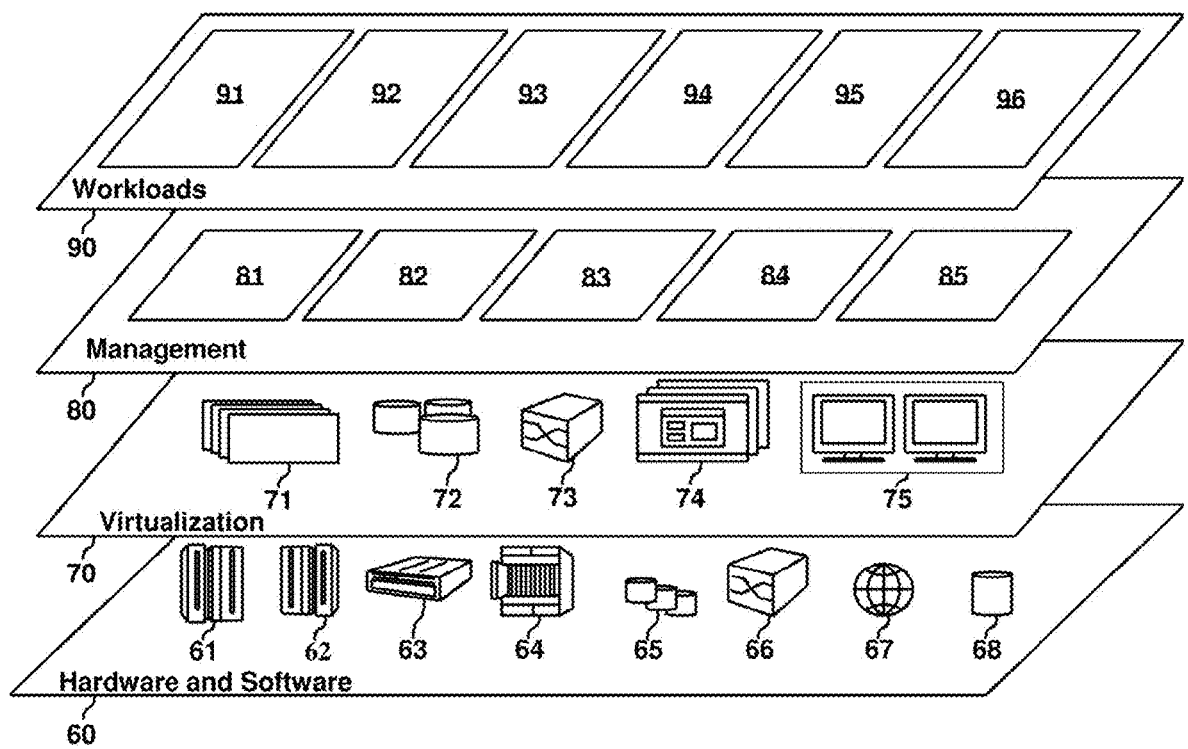
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 which can include distribution of encryption keys for tokens and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

It should be noted that while implementation of the method of an embodiment of the present invention is discussed relative to OpenStack®, the method of an embodiment of the present invention is also applicable to other cloud solutions such as SoftLayer® Infrastructure Management System, VMware®, and other such cloud solutions. Furthermore, Swift, KeyStone and Barbican are only particular implementations within an OpenStack® cloud solution and do not limit the invention to such an implementation.

Figure 3:
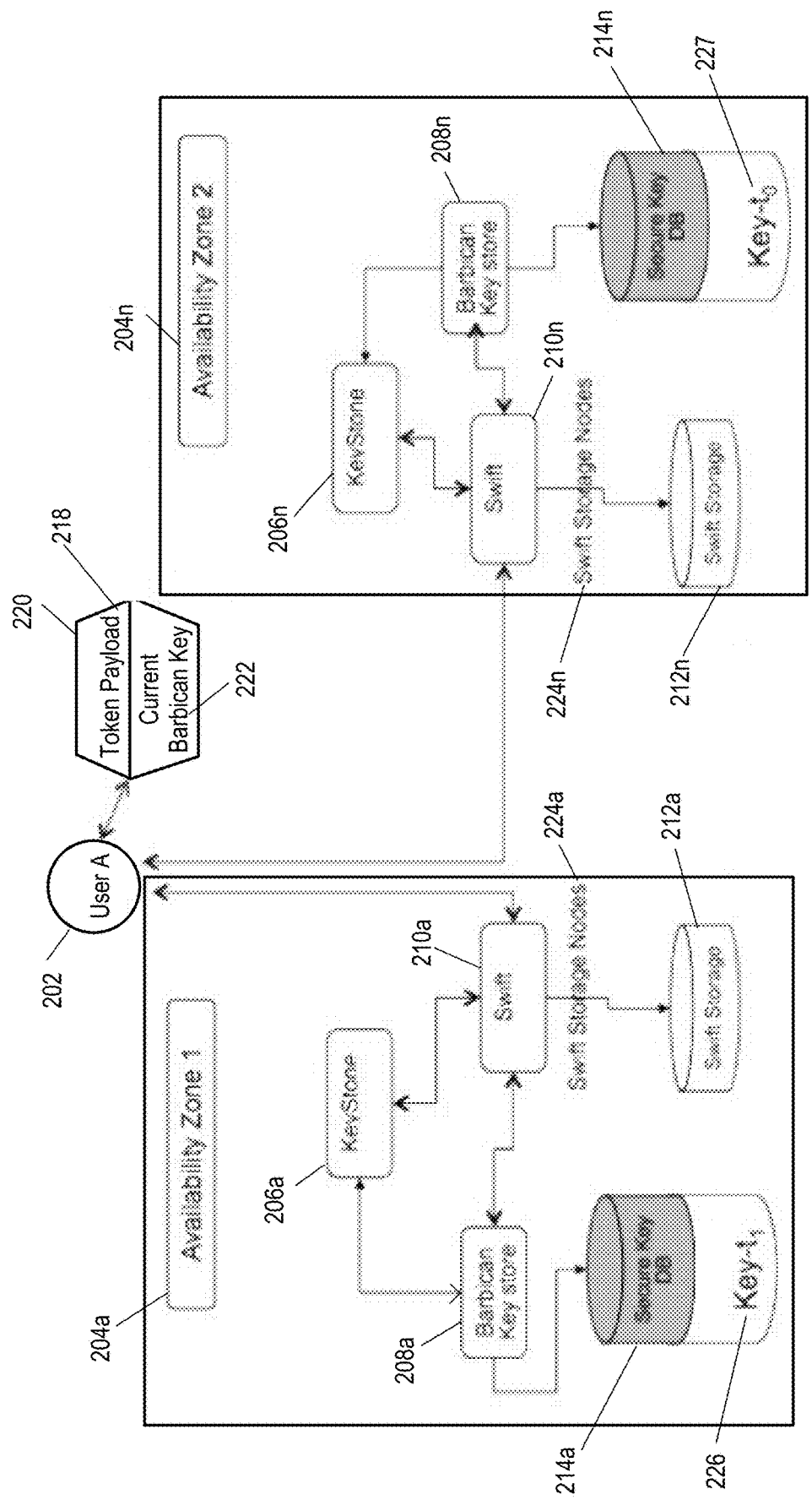
FIG. 3 shows a schematic of a cloud computing environment.

FIG. 3 shows a schematic of a cloud computing environment.

Within the cloud computing environment, there is a plurality of availability zones (AZs) 204a, 204n. While only two AZs 204a, 204n are shown in the figure, it is to be understood that a large number of zones can exist within the cloud computing environment. Each of the AZs 204a, 204n includes an identity service 206a, 206n, such as KeyStone, a scalable redundant object storage system 210a, 210n, such as Swift, and a key manager or keystore 208a, 208n, such as Barbican keystore.

The keystore 208a, 208n is a REST API designed for the secure storage and includes a secure key database 214a, 214n containing cryptographic keys Key-$t_1$, Key-$t_0$, 226, 227. It should be noted that Key-$t_1$ is activated or current and that Key-$t_0$ is deprecated for the sake of the example in the present embodiment.

The scalable redundant object storage system 210a, 210n includes a plurality of storage nodes 224a, 224n each with encrypted storage 212a, 212n. Objects and files are written to the storage 212a, 212n of the multiple storage nodes 224a, 224n.

The identity service 206a, 206n is in communication with the scalable redundant object storage system 210a, 210n and the keystore 208a, 208n. The identity service 206a, 206n can create tokens 220 with a payload 218, but without the current key 222. The identity service 206a, 206n can also authenticate a user and an associated token 220 containing a payload 218 and a current key 222.

The keystore 208a, 208n is in communication with the scalable redundant object storage system 210a, 210b. The keystore 208a, 208n may authenticate the user's token 220.

The scalable redundant object storage system 210a, 210b is in communication with a user 202 via an interface.

The user 202 is authenticated to access services within the cloud environment through the use of a token 220. The token 220 is a ferret token in one embodiment and includes a current cryptographic key 222 specific to the user and a payload 218. The fernet token 220 provides user authentication for access to a cloud service.

A user's fernet token 220 is created when the user 202 logs into the system. Then the user 202, via browser or API call, contacts the scalable redundant object storage system 210a, 210n (Swift) to confirm whether a token 220 is attached. If no token 220 is attached, object storage system 210a, 210n redirects the API call to the identity service 206a, 206n (KeyStone). After authenticating with the identity service 206a, 206n via a username/password, or API key, or other authentication method, the identity service 206a, 206n creates and returns a token 220. It should be noted that when the token 220 is first returned to the user after an initial authentication of the user, a Barbican Key 222 is not yet present. The token 220 only contains a payload 218. The identity service 206a, 206n supports various token types such as: fernet, PKI/PublicKey, and others.

When user A 202 sends another call back to the object storage system 210a, 210n, the object storage system checks the token 220 received with the request and can automatically confirm that the user 202 has successfully authenticated with the identity service 206a, 206n. In order for the object storage system 210a, 210n to grant User A 202 access to the encrypted items or objects present in the encrypted storage 212a, the object storage system 210a, 210n needs a user's key from the keystore 208a, 208n (Barbican Keystore). The object storage system 210a, 210n requests the user's symmetric key 226 from keystore 208a, 208n. The keystore 208a, 208n returns the user's symmetric key 226 to the object storage system 210a, 210n and the object storage system encrypts on writes or decrypts on reads. The object storage system 210a, 210n then executes the request of the user via the browser or the API. When the object storage system 210a, 210n returns the result of the request back to the user A 202, the object storage system 210a, 210n returns an updated fernet token 220 which includes the most current Barbican key 222 inside the encrypted payload 218.

When the user A 202 goes to the another AZ, for example Availability Zone 2 204n and attempts to:
Write→

The object storage system 210n will check key-$t_0$ and key-$t_1$ from the fernet token 220. If key-$t_1$ is the current key, keystore 208n will encrypt the token 220 with Key-$t_1$ 226, mark key-$t_0$ as deprecated, and store key-$t_1$ 226 as the current key within the keystore 208n. If key-$t_0$ 227 is most current, the keystore will place the key-$t_0$ 227 in the fernet token payload as most current.
Read→

The object storage system 210n first reads and decrypts the data with the local symmetric key, key-$t_0$, first. Then the object storage system 210n compares keys to determine the current key, just like above with "write". If the current key is key-$t_1$ 226, the object storage system 210n will encrypt the read data with current key and write the encrypted data to storage 212a. Key-$t_1$ 226 is then stored as the current key in the keystore 214n and key-$t_0$ 227 as the deprecated key back into the keystore 210n.

In an alternate embodiment, the token may be a public key infrastructure (PKI) that contains a current key. The current key is the PKI and is the complete infrastructure needed for managing public keys, such as roles and policies for linking a public-key to a specific entity.

Fernet tokens 220 contain a limited amount of information such as user identity, expiration period and authorization data in a payload 218. The data inside a fernet token 220 is protected using symmetric encryption or cryptographic keys, or fernet keys 226, 227. Therefore, the current cryptographic key 222 within the token is itself encrypted and may be known as "wrapping key". The wrapping key is only shared with authorized keystores. Therefore, when the fernet/PKI authentication token is used and sent upon with each request, the current user cryptographic key can only be decrypted/unwrapped by authorized systems such as the barbican keystores.

A fernet key 226, 227 is used to encrypt and decrypt fernet tokens 220. Each key 226, 227 is actually composed of two smaller keys: a 128-bit AES encryption key and a 128-bit SHA256 HMAC signing key. The keys 226, 227 are held in a key repository 214a, 214n of the keystore 208a, 208n and are used for encryption and decryption of the tokens 220.

It should be noted that the authentication of the user 202 in an embodiment of the present invention does not rely on a central keystore, central keystore master, or hierarchy of keystores. Instead, in an embodiment of the present invention, the authentication mechanism is altered and authentication token/credentials are used to provide a just-in-time key synchronization. A keystore is present in each AZ.

In an embodiment of the present invention, encrypted data and the synchronization of cryptographic keys takes place within the keystore 208a, 208n of a global cloud environment. A Key Management System (KMS) or Key Lifecycle Management System (KLMS) may be used in an embodiment of the present invention, but is not necessary.

Figure 4A:
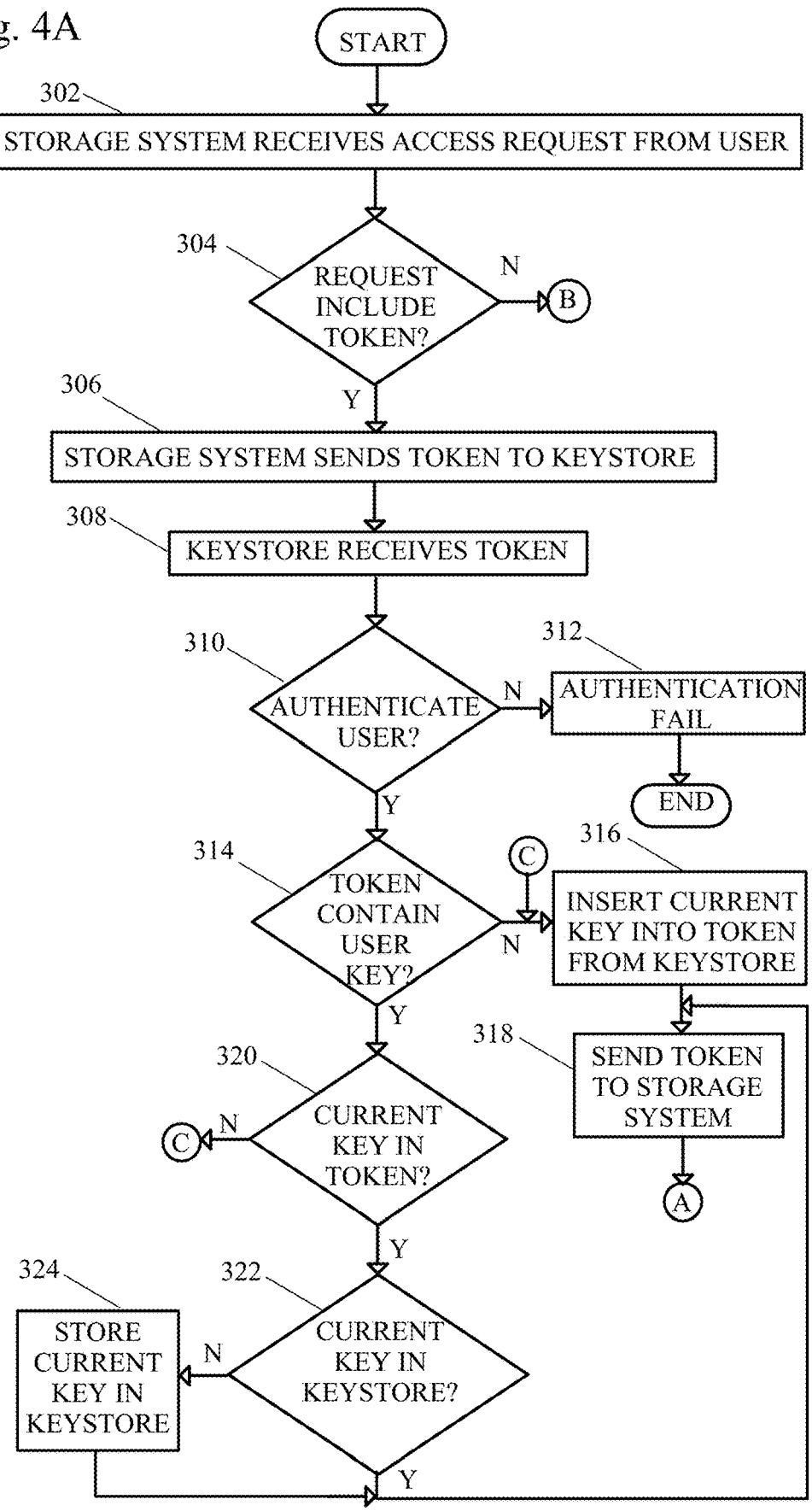
FIGS. 4A-4C show a flowchart of a method of distributing encryption keys for tokens in a cloud environment.
Figure 4B:
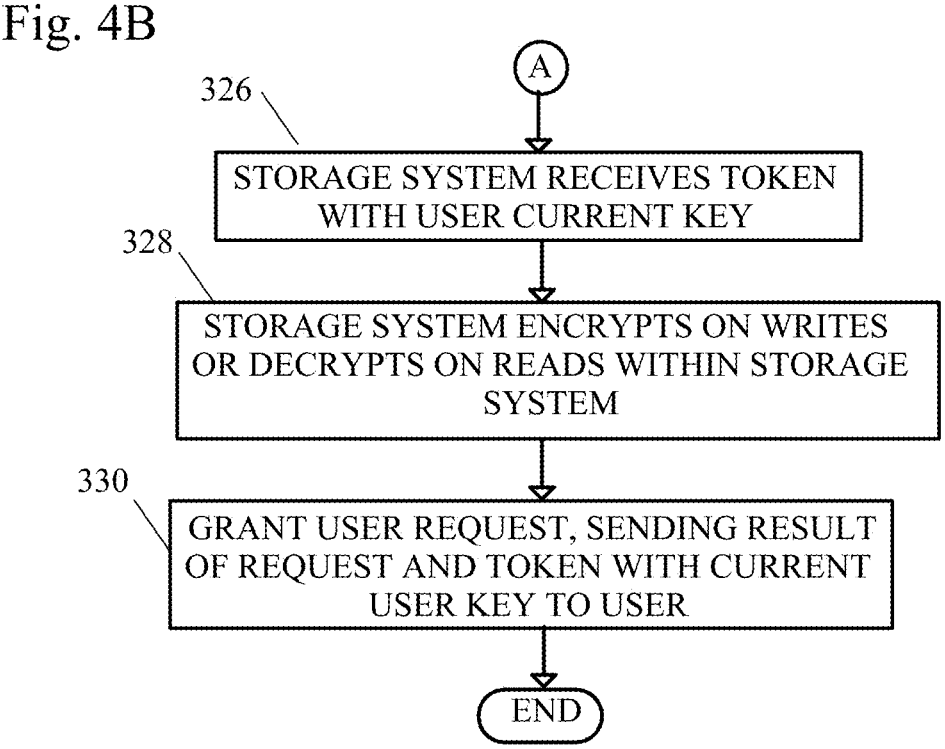
Figure 4C:
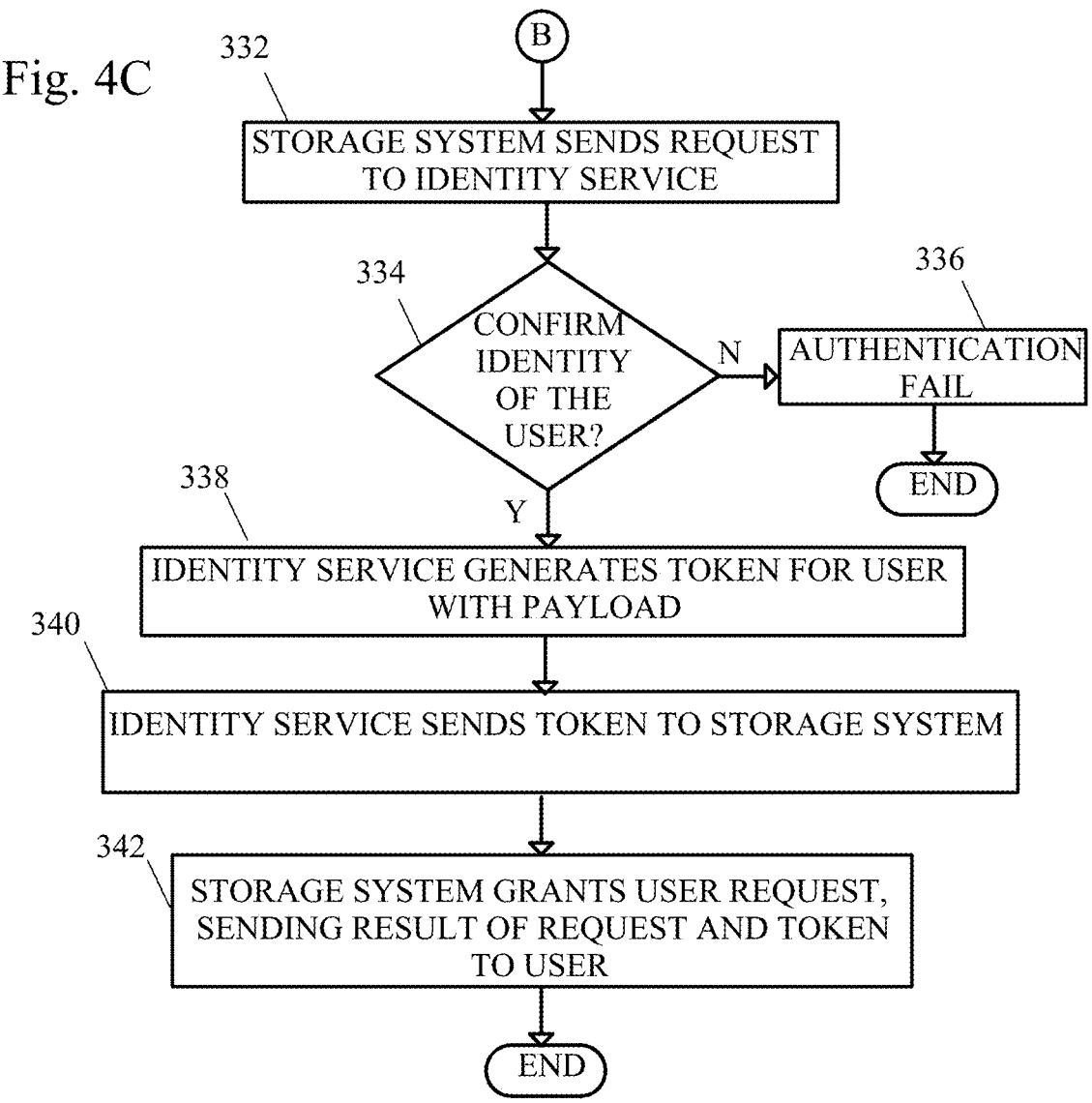

FIGS. 4A-4C show a flowchart of a method of distributing encryption keys for tokens in a cloud computing environment.

In a first step, the scalable redundant storage system 210a, such as Swift, receives an access request from the user 202 via an interface for access to a cloud service of the cloud computing environment (step 302).

If the access request does not include a token (step 304), referring to FIG. 4C, the storage system sends the request to an identity service 206a, for example KeyStone (step 332). The identity service 206a attempts to confirm the identity of the user (step 334).

If the identity of the user cannot be confirmed (step 334), authentication fails (step 336), access to the cloud service by the user is denied and the method ends. The identity of the user may be confirmed through login information such as password and username. Other methods of confirming identity may also be used. The identity of the user cannot be confirmed when the login information does not match the login information stored in the identity service for the user.

If the identity of the user is confirmed (step 334), the identity service generates a token 220, for example a fernet token with a payload 218 only (step 338).

The identity service 206*a* sends the token 220 to the storage system 210*a* (step 340).

The storage system 210*a* grants the user request to access to the cloud service and sends the result of the request and the token 220 with the payload only 218 to the user (step 342) and the method ends. The token 220 can be used for subsequent logons for a period of time.

Referring back to FIG. 4A, If the access request does include a token 220 (step 304), the storage system 210*a* sends the token to the keystore (step 306). The token 220 preferably contains at least a payload 218 which authenticates the user in an availability zone of a cloud computing environment.

The keystore receives the token (step 308). The keystore attempts to authenticate the user based on the token (step 310). If the keystore 208*a* cannot authenticate the user, authentication fails (step 312), access to the cloud service by the user is denied and the method ends. It should be noted that the keystore could also send the token to the identity service 206*a* to authenticate the user based on the token.

If the keystore authenticates the user based on the token (step 310), the keystore determines whether the token contains a user key (step 314). If does not contain a token key (step 314), the keystore inserts a current key into the token from the keystore database 214*a* (step 316) and the token is sent to the storage system (step 318). Referring to FIG. 4B, the storage system receives the token with the user's current key (step 326). The storage system encrypts on writes or decrypts on reads within the storage database based on the user's key (step 328) and the storage system grants the user request, sending the result of the request and the token with the current user key to the user (step 330) and the method ends.

If the keystore authenticates the user based on the token (step 310), and the token does contain a token key (step 314), it is determined whether the current key is in the token (step 320) by the keystore. If the key present in the token is not the current key in the keystore (step 320), the keystore inserts the current key into the token from the keystore (step 316) and the token is sent to the storage system (step 318) and the method continues as stated above.

If the current key is in the token (step 320) and not present in the keystore (step 322), the keystore stores the current key from the token into the keystore marks the present key in the keystore as deprecated (step 324) and the method continues to step 318 of sending the token to the storage system.

If the current key is in the token (step 320) and is present in the keystore (step 322), the method continues to step 318 of sending the token to the storage system.

By updating the token to include the most current key, a user can access cloud services across multiple AZs without having to rely on syncing between key managers over multiple availability zones, improving the cloud environment. It should be noted that the cryptographic key is protected under the same encryption as is present in the token.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of distributing encryption keys for tokens for a user to access at least one service in a software environment comprising a plurality of availability zones each availability zone comprising an identity service, a storage system, and a keystore, the method comprising the steps of:
   the storage system receiving an access request from the user containing a token comprising a payload and a current user cryptographic key, to access the at least one service in a first availability zone of the software environment;
   the storage system sending the token from the access request to the keystore to authenticate the user;
   the keystore authenticating the user based on the payload of the token;
   the keystore comparing the current user cryptographic key to user cryptographic keys in the keystore;
   the keystore updating the user cryptographic key in the token or in the keystore with the most current cryptographic key and deprecating the other cryptographic key;
   the keystore sending the token with the current cryptographic key to the storage system; and
   the storage system receiving the token with the current cryptographic key and granting access to the user for the service and sending the token to the user containing the current cryptographic key.

2. The method of claim 1, wherein the token is a fernet token.

3. The method of claim 1, wherein the token is a public key infrastructure token.

4. The method of claim 1, wherein when the token comprises the current cryptographic key, the keystore deprecating the cryptographic key in the keystore and storing the current cryptographic key in the key store.

5. The method of claim 4, wherein the storage system encrypts and decrypts objects within the storage system based on the current cryptographic key.

6. The method of claim 1, wherein when the keystore comprises the current cryptographic key, the keystore removing and deprecating the cryptographic key in the token and the keystore inserting the current cryptographic key in the token.

7. The method of claim 1, wherein the current user cryptographic key is encrypted within the token.

8. A computer program product for distributing encryption keys for tokens for a user to access at least one service in a software environment comprising a plurality of availability zones each availability zone comprising an identity service, a storage system, and a keystore, the identity service, the storage system and the keystore each comprising a computer comprising at least one processor, one or more memories, one or more computer readable storage media, the computer program product comprising a computer readable storage medium having program instructions embodied therewith, the program instructions executable by the computer to perform a method comprising:
   receiving, by the storage system, an access request from the user containing a token comprising a payload and a current user cryptographic key, to access the at least one service in a first availability zone of the software environment;
   sending, by the storage system, the token from the access request to the keystore to authenticate the user;
   authenticating, by the keystore, the user based on the payload of the token;
   comparing, by the keystore, the current user cryptographic key to user cryptographic keys in the keystore;
   updating, by the keystore, the user cryptographic key in the token or in the keystore with the most current cryptographic key and deprecating the other cryptographic key;
   sending, by the keystore, the token with the current cryptographic key to the storage system; and receiving, by the storage system, the token with the current cryptographic key and granting access to the user for the service and sending the token to the user containing the current cryptographic key.

9. The computer program product of claim 8, wherein the token is a fernet token.

10. The computer program product of claim 8, wherein the token is a public key infrastructure token.

11. The computer program product of claim 8, wherein when the token comprises the current cryptographic key, deprecating, by the keystore, the cryptographic key in the keystore and storing, by the keystore, the current cryptographic key in the keystore.

12. The computer program product of claim 11, wherein the storage system encrypts and decrypts objects within the storage system based on the current cryptographic key.

13. The computer program product of claim 8, wherein when the keystore comprises the current cryptographic key, removing and deprecating, by the keystore, the cryptographic key in the token and inserting, by the keystore, the current cryptographic key in the token.

14. A computer system for distributing encryption keys for tokens for a user to access at least one service in a software environment comprising a plurality of availability zones each availability zone comprising an identity service, a storage system, and a keystore, the computer system comprising a computer comprising at least one processor, one or more memories, one or more computer readable storage media having program instructions executable by the computer to perform the program instructions comprising:

receiving, by the storage system, an access request from the user containing a token comprising a payload and a current user cryptographic key, to access the at least one service in a first availability zone of the software environment;

sending, by the storage system, token from the access request to the keystore to authenticate the user;

authenticating, by the keystore, the user based on the payload of the token;

comparing, by the keystore, the current user cryptographic key to user cryptographic keys in the keystore;

updating, by the keystore, the user cryptographic key in the token or in the keystore with the most current cryptographic key and deprecating the other cryptographic key;

sending, by the keystore, the token with the current cryptographic key to the storage system; and receiving, by the storage system, the token with the current cryptographic key and granting access to the user for the service and sending the token to the user containing the current cryptographic key.

15. The computer system of claim 14, wherein the token is a fernet token.

16. The computer system of claim 14, wherein the token is a public key infrastructure token.

17. The computer system of claim 14, wherein when the token comprises the current cryptographic key, deprecating, by the keystore, the cryptographic key in the keystore and storing, by the keystore, the current cryptographic key in the keystore.

18. The computer system of claim 14, wherein the storage system encrypts and decrypts objects within the storage system based on the current cryptographic key.

19. The computer system of claim 18, wherein when the keystore comprises the current cryptographic key, removing and deprecating, by the keystore, the cryptographic key in the token and inserting, by the keystore, the current cryptographic key in the token.

20. The computer system of claim 14, wherein the software environment is a cloud computing environment.

* * * * *